(12) United States Patent
Bertran Ortiz et al.

(10) Patent No.: US 9,882,841 B2
(45) Date of Patent: Jan. 30, 2018

(54) VALIDATING WORKLOAD DISTRIBUTION IN A STORAGE AREA NETWORK

(71) Applicant: Virtual Instruments Corporation, San Jose, CA (US)

(72) Inventors: Ana Bertran Ortiz, San Francisco, CA (US); Nicholas York, San Ramon, CA (US); Genti Cuni, Mountain View, CA (US)

(73) Assignee: Virtual Instruments Corporation, San Jose, CA (US)

( * ) Notice: Subject to any disclaimer, the term of this patent is extended or adjusted under 35 U.S.C. 154(b) by 526 days.

(21) Appl. No.: 14/162,605

(22) Filed: Jan. 23, 2014

(65) Prior Publication Data
US 2015/0207763 A1    Jul. 23, 2015

(51) Int. Cl.
| | | |
|---|---|---|
| *G06F 15/173* | (2006.01) | |
| *H04L 12/939* | (2013.01) | |
| *H04L 29/08* | (2006.01) | |
| *H04L 12/707* | (2013.01) | |
| *H04L 12/729* | (2013.01) | |

(52) U.S. Cl.
CPC ............ *H04L 49/552* (2013.01); *H04L 45/22* (2013.01); *H04L 67/1097* (2013.01); *H04L 45/125* (2013.01)

(58) Field of Classification Search
CPC ..................................................... H04L 49/552
USPC ........................................................ 709/241
See application file for complete search history.

(56) References Cited

U.S. PATENT DOCUMENTS

| | | | | |
|---|---|---|---|---|
| 6,209,033 B1* | 3/2001 | Datta | .................. | H04L 41/0813 370/232 |
| 6,802,021 B1* | 10/2004 | Cheng | .................. | G06F 11/0727 710/316 |
| 2003/0079018 A1* | 4/2003 | Lolayekar | .................. | G06F 3/06 709/226 |
| 2005/0243725 A1* | 11/2005 | Wrenn | .................... | H04L 69/40 370/238 |
| 2007/0060186 A1* | 3/2007 | Ganesan | .................. | H04L 41/06 455/522 |
| 2013/0246705 A1* | 9/2013 | Diare | .................. | G06F 11/3433 711/114 |

\* cited by examiner

*Primary Examiner* — Tauqir Hussain
(74) *Attorney, Agent, or Firm* — Lowenstein Sandler LLP (57) ABSTRACT

An information system identifies redundant communication paths between a server and a storage device in a storage area network and classifies the state of the paths according to the distribution of workload amongst them. To make the classification, the information system pairs up active paths. For each pair of active paths, the information system identifies traffic data of the two paths. The information system compares the traffic data of the two paths. Based on the comparison, the information system determines whether workload is balanced or imbalanced between the two paths.

19 Claims, 5 Drawing Sheets

VALIDATING WORKLOAD DISTRIBUTION IN A STORAGE AREA NETWORK

BACKGROUND

Technical Field

The described embodiments pertain in general to data networks, and in particular to determining whether there is a load balanced and redundant environment in a storage area network.

Description of the Related Art

A storage area network (SAN) is a data network that includes, for example, multiple servers and storage devices connected via multiple fabrics. The servers access the storage devices for storing and retrieving block level data. Typically a storage area network is deployed as two isolated fabrics of interconnected switches and components. These two fabrics are usually completely separate from each other, with no interconnections between them so that no failure on one fabric can affect the other, redundant fabric. Each storage device is attached with half of its connections (storage ports) to the first fabric, and the other half of its connections to the second fabric. Each server is likewise attached with at least one connection (host bus adapter (HBA)) to each fabric. When a block device is presented from a storage device to a server it is generally made available via multiple storage ports, through the redundant fabrics to multiple HBAs on the server (i.e., made available through multiple paths). One reason for using multiple paths is for redundancy. If one path becomes unavailable, for example, due to a component failure, other paths can continue the exchange of data. Another reason for using multiple paths is that it allows for more data to be exchanged between the devices.

In order for the paths to provide the desired redundancy, they have to be functional. An active/passive model where all of the traffic uses a single path until that path fails and then another path is brought online leaves open the risk that when the first path fails, the second path is not available to come online. Similarly, if there is not an equal amount of traffic between paths (i.e., the paths are imbalanced), then that could be because the same set of storage devices (targets, logical unit numbers) are not available on both paths. This would mean that if one path failed, some devices would not be available on the redundant path, resulting in a failure. Additionally, not balancing the workload puts more workload on a single path and this can lead to data exchange slowdowns for the host making the request, or any host communicating through the overworked components. Therefore, identifying and remediating load imbalances is important to maintaining an effective and efficient SAN.

SUMMARY

The described embodiments provide methods, computer program products, and systems for determining workload balance and redundancy of paths in a storage area network (SAN). An information system identifies redundant communication paths between a server and a storage device in a SAN and classifies the state of the paths according to the distribution of workload amongst them.

To make the classification, the information system pairs up active paths representing alternate courses to the same storage device across redundant host bus adapters (HBAs), storage ports, switches, and fabrics. For each pair of active paths, the information system identifies traffic data of the two paths described, for example, in bytes or frames per second. The information system compares the traffic data of the two paths. Based on the comparison, the information system determines whether workload is balanced or imbalanced between the two paths. Additionally, for the pair, the information system determines a redundancy score that indicates how well one path of the pair would be able to continue data transfer between the server and the storage device if a component failed along the other path.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
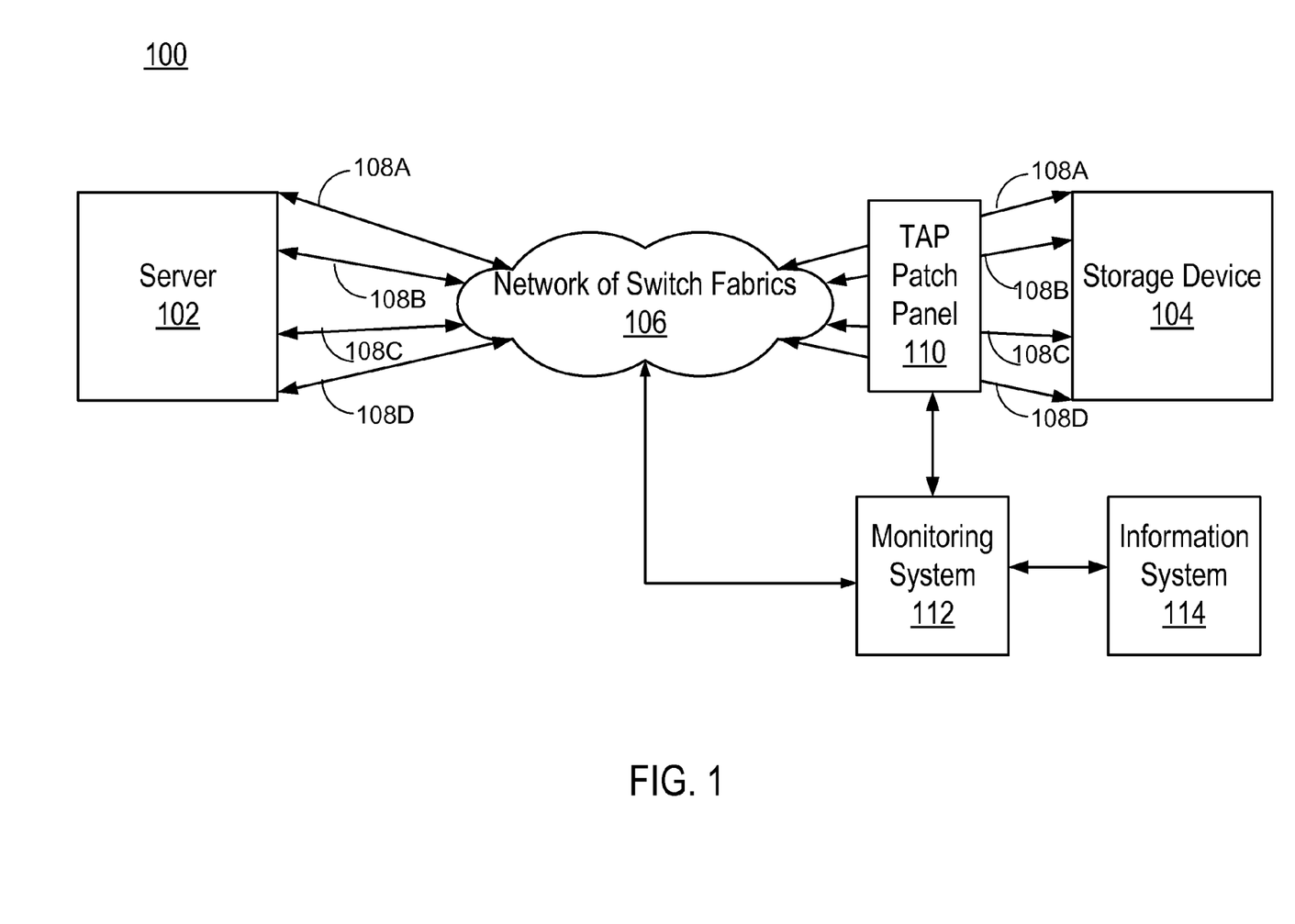
FIG. 1 is a block diagram of a monitored storage area network (SAN) 100 according to one embodiment.

FIG. 1 is a block diagram of a monitored storage area network (SAN) 100 according to one embodiment. The SAN 100 includes at least one server 102 and at least one storage device 104. The server 102 and the storage device 104 are connected via a network of switch fabrics 106. Although the illustrated SAN 100 only includes a single server 102 and storage device 104, other embodiments can include more of each entity (e.g., multiple servers 102 and multiple storage devices 104).

FIG. 1 uses like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral (e.g. "101" in the text refers to reference numerals "101A," "101B," and/or "101C" in the figures).

The server 102 is a computing system that has access to the storage capabilities of the storage device 104. The server 102 may provide data to the storage device 104 for storage and retrieve stored data from the storage device 104. Therefore, the server 102 acts as a source device when providing data to the storage device 104 and acts as a destination device when requesting stored data from the storage device 104.

The storage device 104 is a storage system that stores data. In one embodiment, the storage device 104 is a disk array. In other embodiments, the storage device 104 is a tape library or an optical jukebox. When the storage device 104 receives a request from the server 102 to store data, the storage device 104 stores the data according to the request.

When the storage device 104 receives a request from the server 102 for stored data, the storage device 104 retrieves the requested data and transmits it to the server 102.

The server 102 and the storage device 104 communicate and exchange data via the network of switch fabrics 106. The network of switch fabrics 106 includes one or more fiber channel switch fabrics. Each fabric of the network 106 includes one or more fiber channel switches that route data between devices.

The server 102 and the storage device 104 use one or more paths through the network of switch fabrics 106 to exchange data. A path is a specific route through which data travels between two endpoints (e.g., the server 102 and the storage device 104). In the embodiment of FIG. 1, four paths 108A, 108B, 108C, and 108D are used to exchange data between the server 102 and the storage device 104.

Figure 2:
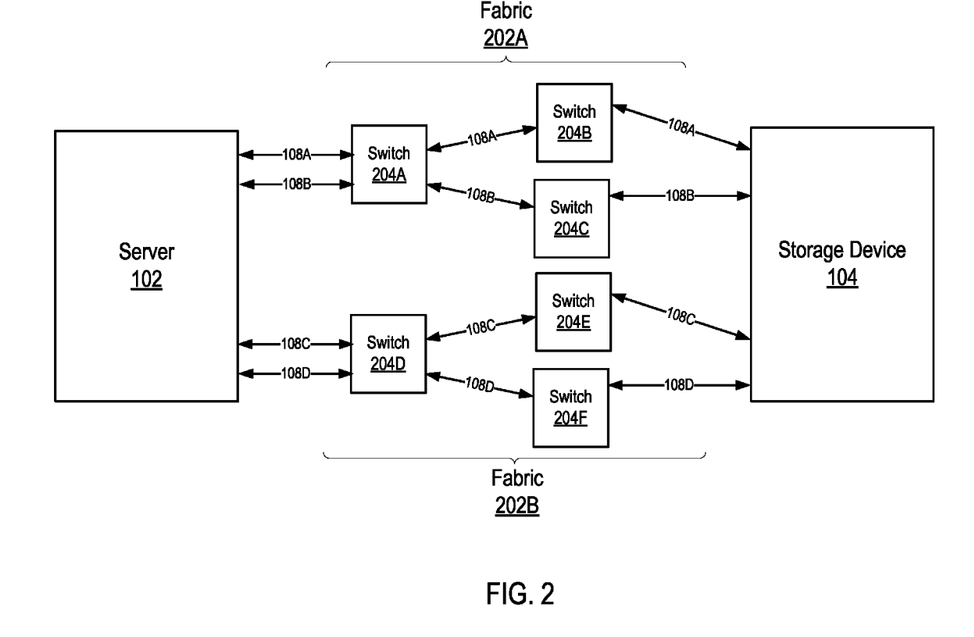
FIG. 2 is a block diagram illustrating an example of a network of switch fabrics according to one embodiment.

FIG. 2 illustrates an example of the paths 108 through the network of fabrics 106. In the example of FIG. 2, the network of switch fabrics 106 includes two fabrics 202A and 202B. Fabric 202A includes switches 204A, 204B, and 204C. Fabric 202B includes switches 204D, 204E, and 204F. For path 108A, data is routed through switches 204A and 204B of fabric 202A. For path 108 B, data is routed through switches 204A and 204C of fabric 202A. For path 108C, data is routed through switches 204D and 204E of fabric 202B. For path 108D, data is routed through switches 204D and 204F of fabric 202B. In typical installations, the fabrics 202 can be much more complex than shown in FIG. 2, so the number of possible paths will be correspondingly large.

Returning to FIG. 1, the monitored SAN 100 also includes a traffic access point (TAP) patch panel 110, a monitoring system 112, and an information system 114. The TAP patch panel 110 is a hardware device inserted between the server 102 and the storage device 104. The TAP patch panel 110 diverts at least a portion of the signals being transmitted along each path to the monitoring system 112.

In one embodiment, much of the network communications are provided via optical signals traveling on optical fibers and converted to electrical signals at various devices (e.g., server 102, storage device 104, and monitoring system 112). According to this embodiment, the TAP patch panel 110 operates by diverting a portion of light headed to either the server 102 or the storage device 104 to an optical fiber connected to the monitoring system 112.

The monitoring system 112 is a computing system that processes the signals diverted by the TAP patch panel 110. In one embodiment, the monitoring system 112 is the VirtualWisdom SAN Performance Probe provided by Virtual Instruments Corporation of San Jose, Calif. The monitoring system 112 analyzes the signals received from the TAP patch panel 110 and/or from software probes getting data from components (e.g., switches) in the fabrics. Based on the analyzed signals, the monitoring system 112 measures and/or calculates several metrics (may also be referred to as "traffic data") that describe network traffic on a path. In one embodiment, for each path, the monitoring system 112 collects (measures and/or calculates) traffic data that measure performance, utilization, and events of a path. Examples of traffic data that may be collected for each path include: data transmission rate through the path (e.g., the average number of bits transmitted along the path per a unit time, such as megabits per second), read exchange completion time (average amount of time it takes for a read command along the path to be processed), write exchange completion time (average amount of time it takes for a write command along the path to be processed), and average input output operations per second.

In one embodiment, the monitoring system 112 associates a time with collected traffic data of a path. The time indicates when the conditions described by the traffic data existed in the path. For example, if the traffic data is "Y megabits per second on average" and a time X is associated with the data, it signifies that at time X the average data transmission rate through the path was Y megabits per second. In one embodiment, the frequency with which the monitoring system 112 captures traffic data is set by a system administrator.

On a periodic basis the monitoring system 112 transmits the collected traffic data to the information system 114. In one embodiment, the traffic data is transmitted to the information system 114 via a local area network.

The information system 114 is a computing system that provides users with information regarding the health of the SAN 100. Upon request from a user or at a preset time, the information system 114 analyzes traffic data received from the monitoring system 112 and based on the data determines characteristics that describe the overall health of the SAN 100. In one embodiment, the health characteristics determined by the information system 114 include a determination of the workload balance among paths 108 and whether there is sufficient redundancy among the paths 108 to be able to handle network component failures.

Figure 3:
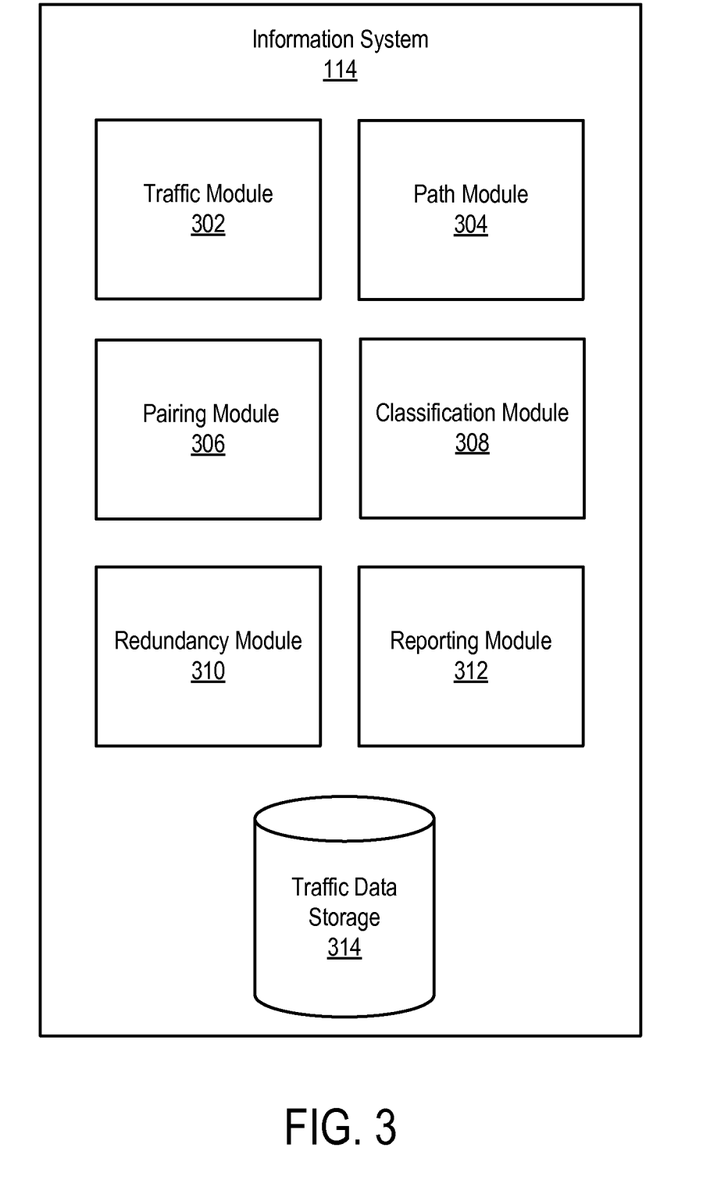
FIG. 3 is a block diagram illustrating modules within an information system according to one embodiment.

FIG. 3 is a block diagram illustrating modules within the information system 114 according to one embodiment. The information system 114 includes a traffic module 302, a path module 304, a pairing module 306, a classification module 308, a redundancy module 310, a reporting module 312, and a traffic data storage 314. Those of skill in the art will recognize that other embodiments can have different and/or other modules than the ones described here, and that the functionalities can be distributed among the modules in a different manner.

The traffic module 302 processes traffic data received from the monitoring system 112. In one embodiment, when traffic data of a path is received from the monitoring system 112, the traffic module 302 stores the data in the traffic data storage 314. Based on the storing of the data received from the monitoring system 112, for each path the traffic data storage 314 includes various data points that describe network traffic on the path at various times. For example, for each path, the traffic data storage 314 may include the data transfer rate of the path at every hour.

The path module 304 initiates a process of determining health characteristics of the SAN 100. In one embodiment, the process is initiated when a request is received from a user (e.g., a system administrator) to perform the process. In one embodiment, the process is initiated periodically (e.g., once a day) at a preset time. The process specifically involves determining workload balance and redundancy characteristics of the paths between the server 102 and the storage device 104.

As part of the process, the path module 304 identifies the paths between the server 102 and the storage device 104 based on the information stored in the traffic data storage 314. If the path module 304 determines that there is only one path between the server 102 and the storage device 104, the path module 304 classifies the path as a single path 108 with no redundancy. If the path module 304 determines that there are multiple paths, the path module 304 retrieves from the traffic data storage 314 for each path, traffic data of a specific type and associated with times that are within a certain time period. For example, for each path the path module 304 may retrieve data transmission rates stored in the traffic data storage 314 that are associated with times that are within the past 12 hours. Therefore, based on the data retrieval from the traffic data storage 314, a data series is identified for each path with multiple traffic data points.

For each path, the path module 304 sums the data points of the path's data series. If the sum of a path's data points is below a no traffic threshold, the path module 304 classifies the path as having no traffic. Additionally, the path module 304 analyzes the maximum value in the data series of each path. If a path's maximum value is below a minimal traffic threshold, the path module 304 classifies the path as having minimal traffic.

If two or more of the paths are not classified as having no traffic or minimal traffic, the path module 304 identifies these paths as active paths for which a determination is to be made as to whether the paths are load balanced or imbalanced. The path module 304 notifies the pairing module 306 of the identified active paths. For the paths classified as having no traffic or minimal traffic, the balanced/imbalanced determination is not made because they do not have sufficient traffic.

The pairing module 306 pairs up active paths for determining load balance between pairs. For each path identified by the path module 304 as active, the pairing module 306 identifies another active path to be used for determining workload distribution between the paths. In other words, the active paths are paired up. In one embodiment, an active path may be paired with more than one other active path for purposes of determining workload distribution.

In one embodiment, for each active path, to determine the path to pair it with, the pairing module 306 considers several factors of each of the other active paths. One factor is whether the active path being paired and another path being considered are on different fabrics. Another factor is the similarity between the two paths' data series. A factor that may also be considered is whether the two paths have high data transmission rates and low data transmission rates at similar times.

In one embodiment, to pair an active path, the pairing module 306 identifies other active paths that are not on the same fabric as that of the path being paired. From the identified other paths, the pairing module 306 selects for pairing the one whose data series is most similar to that of the path being paired. If all of the other paths are on the same fabric as the path being paired, the pairing module 306 pairs the active path with the path whose data series is most similar to that of the path being paired.

In another embodiment, pairing module 306 pairs an active path by calculating a pairing score for each of the other active paths. The factors mentioned above are used in calculating the pairing score for each of the other active paths. Each factor contributes a certain amount of points towards the score. In one embodiment, the different amount of points each factor may contribute towards a score is set by a system administrator.

The classification module 308 classifies each active path as having balanced or imbalanced workload with respect to a paired active path. In one embodiment, to determine whether to classify an active path as balanced or imbalanced, the classification module 308 determines which path it was paired with by the pairing module 306 (path paired with referred to as "paired path" herein). For the active path and the paired path, the classification module 308 identifies the data series of each of the respective paths which was identified by the path module 304.

The classification module 308 calculates a noise threshold for identifying data points in the data series that will help determine whether the paths are balanced or imbalanced. In one embodiment, the classification module 308 calculates a noise threshold using each data series. In other words, the classification module 308 calculates a noise threshold using the data series of the active path and calculates another noise threshold using the data series of the paired path. From the two thresholds, the classification module 308 selects to use the highest calculated threshold as the noise threshold. In another embodiment, the classification module 308 calculates a single noise threshold (e.g., by only using the data series of the active path) and uses that threshold.

To calculate the noise threshold using a data series, the classification module 308 determines the maximum value in the data series. The classification module 308 additionally applies a running median filter on the data series. Once the median filter has been applied, the classification module 308 identifies the minimum value in the filtered data series. The classification module 308 determines the noise threshold to be a set percentage (e.g., 80%) between the maximum and minimum values.

When the noise threshold has been calculated, the classification module 308 removes from consideration data points from the active path's data series that are below the noise threshold. For each data point remaining in an active path's data series, the classification module 308 compares the data point to a corresponding data point in the paired path's data series. In one embodiment, two data points correspond if they are associated with the same time. For example, the classification module 308 compares the data transmission rate of the active path at time Z to the data transmission rate of the paired path at time Z.

Based on the comparison, the classification module 308 calculates a percentage difference between the two data points. If the percentage difference is less than a set classification threshold, the data points are classified as balanced. On the other hand, if the percentage difference is greater than the classification threshold, the data points are classified as imbalanced.

Based on the classification of the data points, the classification module 308 classifies the active path and possibly the paired path as balanced or imbalanced. In one embodiment, if all of the data points were classified as balanced, the classification module 308 classifies the active path and the paired path as balanced paths. If all the data points were not classified as balanced, the classification module 308 determines how to classify the paths based on one or more of the following values: percentage of data points in active path's data series classified as imbalanced, percentage of data points in active path's data series classified as balanced, average value of the active path's data points classified as balanced, and average value of the active path's data points classified as imbalanced.

In one embodiment, the active path and paired path are each classified as balanced if each of the following conditions is satisfied with respect to the data series of the active path: (1) percentage of data points classified as imbalanced less than a first set number, (2) difference between percentage of data points classified as balanced and percentage of data points classified as imbalanced greater than a second set number, and (3) difference between average value of data points classified as balanced and average value of the data points classified as imbalanced greater than a third set number.

If the three conditions are not satisfied, the active path is classified as being imbalanced with respect to the paired path. In one embodiment, if the active path is classified as imbalanced, the paired path is not itself classified as imbalanced. Instead the classification module 308 repeats the process for classifying as balanced or imbalanced but makes the determination with the paired path being the primary path (i.e., the active path) and the determination is made with respect to whichever path the pairing module 306 identified as its pair. Therefore, in this embodiment, if the active path is classified as balanced the paired is also classified as balanced. However, if the active path is classified as imbalanced, an independent determination is made as to whether the paired path is imbalanced.

If an active path is classified as imbalanced, the classification module 308 analyzes the data series of the path for patterns that show changes from being balanced to imbalanced and vice versa. For this analysis, the classification module 308 analyzes the data points of the active path's data series in sequential order according to their associated times.

In one embodiment, the classification module 308 analyzes the data series to determine whether it fits a recently balanced pattern. The classification module 308 determines that the data series matches the recently balanced pattern if majority of the data points in the first half of the data series were classified as imbalanced but a certain percentage (e.g., more than 45%) of continuous data points in the second half were classified as balanced. If the classification module 308 determines that the data series matches the recently balanced pattern, the classification module 308 provides the path with a sub-classification of recently balanced.

In one embodiment, the classification module 308 analyzes the data series to determine whether it fits a recently imbalanced pattern. The classification module 308 determines that the data series matches the recently imbalanced pattern if a certain percentage of the data points in the first half of the data series were classified as balanced but a majority of continuous data points in the second half were classified as imbalanced. If the classification module 308 determines that the data series matches the recently imbalanced pattern, the classification module 308 provides the path with a sub-classification of recently imbalanced.

Further, if an active path is classified as imbalanced, the classification module 308 determines an imbalance score which is a measure of how imbalanced the active path is with respect to the paired path. In one embodiment, to determine the imbalance score of the active path, the classification module 308 calculates the difference between each data point in the active path's data series and its corresponding data point in the paired path's data series. The classification module 308 sums calculated differences. The sum of the calculated differences is determined to be the imbalance score of the active path.

The redundancy module 310 determines a redundancy score for paths. In one embodiment, the redundancy module 310 calculates a redundancy score for each pair of paths classified by the classification module 308 as balanced. The redundancy metric indicates how well one path from a pair would be able to continue data transfer between the server 102 and the storage device 104 if a component failed along the other path from the pair. The redundancy module 310 calculates the redundancy score for a pair of paths based on several factors. Each factor may contribute a different amount of points towards the metric. In one embodiment, the different amount of points each factor may contribute is set by a system administrator. In one embodiment, one or more of the following factors are used in calculating the redundancy score: whether the paths are on the same fabric or different fabrics, whether each path has less than a certain percentage of utilization (e.g., less than 50% so that in the event that one becomes unavailable the other path would not have more than 100% of its capacity worth of traffic), and whether the paths are between two physically separate HBAs and two separate storage controllers. In one embodiment, each path in the pair receives the same score.

The reporting module 312 notifies users of determinations made by the information system 114 with regards to the health of the SAN 100. In one embodiment, when the information system 114 receives a request from a user device (e.g., device of a system administrator) for information regarding the health of the SAN 100, the reporting module 312 provides a user interface to the user device through which the user can access the information. Through the user interface information is presented to the user regarding the paths between the server 102 and the storage device 104. In one embodiment, the information presented includes the classification given to each path by either the path module 304 or the comparison module 308 (e.g., no traffic, minimal traffic, balanced, imbalanced). If a redundancy score was calculated for a path, the user interface also presents the redundancy score of the path.

For each imbalanced path, the user interface also presents the sub-classification (recently balanced or recently imbalanced) and the imbalanced score determined by the classification module 308. In one embodiment, if the user requests to see which paths are imbalanced, the user interface presents a list of the imbalanced paths sorted based on their respective imbalance score. The information described as being accessible through the user interface may also be included in a report transmitted to a user, for example, via email.

Figure 4:
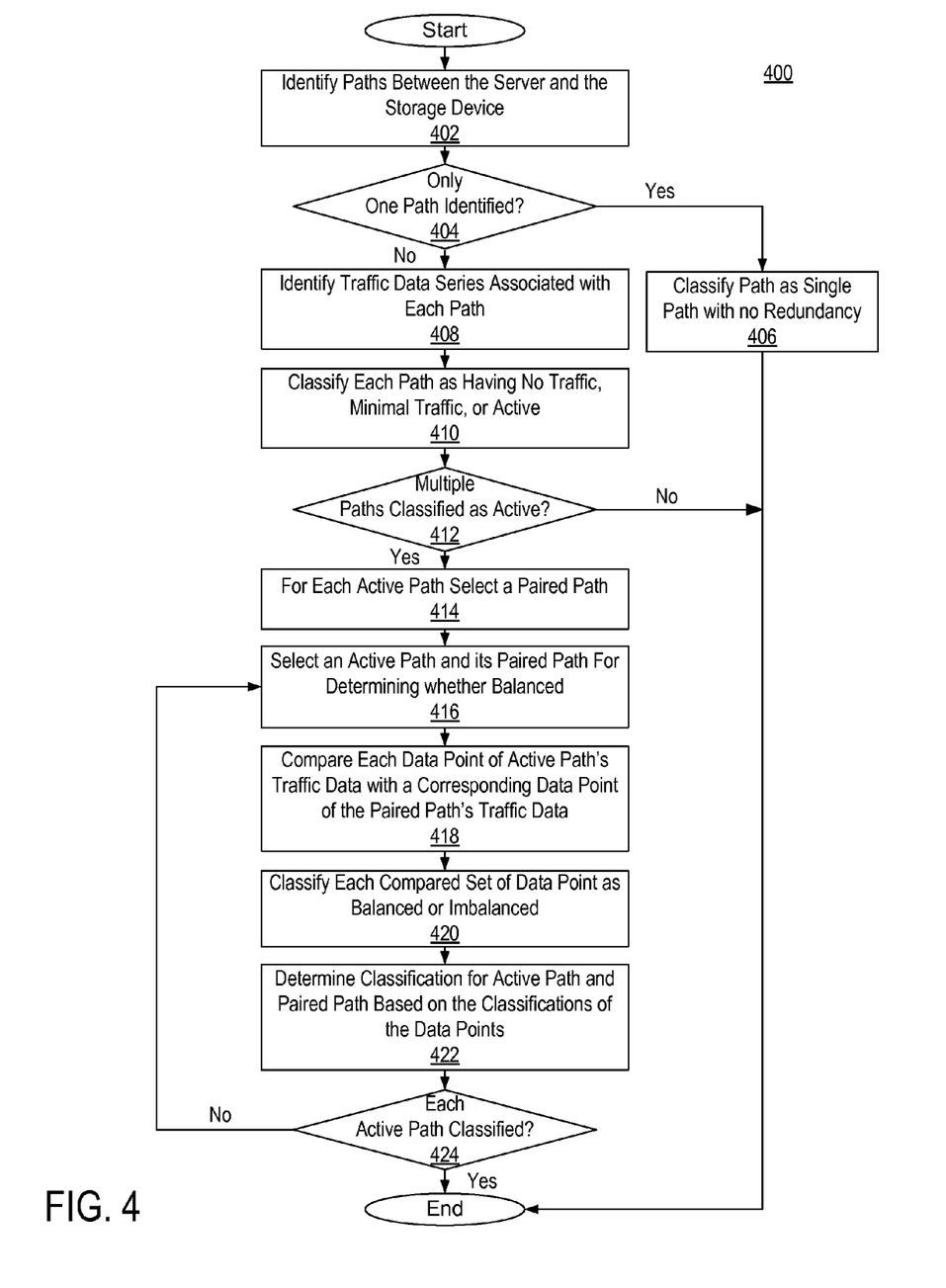
FIG. 4 is a flow diagram of a process for determining workload balance between paths of a storage area network according to one embodiment.

FIG. 4 is a flow diagram of a process 400 performed by the information system 114 for determining workload balance between paths according to one embodiment. Those of skill in the art will recognize that other embodiments can perform the steps of FIG. 4 in different orders. Moreover, other embodiments can include different and/or additional steps than the ones described herein.

The information system 114 identifies 402 paths between the server 102 and the storage device 104. The information system 114 determines 404 if only one path is identified between the server 102 and the storage device 104. If only one path is identified, the information system 114 classifies 406 the path as a single path with no redundancy and the process 400 is terminated. The process 400 is terminated because there is only a single path and as a result there is no workload distribution among multiple paths.

On the other hand if multiple paths are identified, the information system 114 identifies 408 traffic data associated with each of the paths (e.g., data transmission rates). The identified traffic data of each path includes multiple data points that are associated with times that are within a predetermined time period. For example, for each path, the information system 114 may identify data transmission rates of the path at different times within the past 8 hours.

The information system 114 classifies 410 each path as having no traffic, minimal traffic, or being active based on its respective traffic data. The information system 114 determines 412 if multiple paths are classified as active. If two or more of the paths are not classified as active, the process 400 is terminated because there is not sufficient traffic among the paths to determine workload distribution.

On the other hand, if multiple paths are classified as active, for each active path, the information system 114 selects 414 a paired path. The paired path is another one of the active paths selected for determining whether the active path is balanced with respect to the paired path. The information system 114 selects 416 an active path and its paired path for determining whether workload load distribution is balanced among the two paths.

The information system 114 compares 418 each data point of the active path's traffic data with a corresponding data point of the paired path's traffic data. In one embodiment, prior to performing the comparison, the information system 114 removes from consideration data points in the active path's traffic data that are below a noise threshold. The information system 114 classifies 420 each pair of compared data points as balanced or imbalanced based on their percentage difference.

The information system 114 determines 422 a classification of balanced or imbalanced for the active path based on the classification of the data points. In one embodiment, if the active path is classified as balanced, the information system 114 also classifies the paired path as balanced. However, if the active path is classified as imbalanced, the information system 114 does not classify the paired path as imbalanced. An independent determination is made for the paired path as to whether it is balanced or imbalanced.

The information system 114 determines 424 if one or more of paths that are active have not been classified as balanced or imbalanced. If one or more active paths have not been classified as balanced or imbalanced, steps 416-424 are repeated for one of those paths. On the other hand, if each active path has been classified as balanced or imbalanced, the process 400 is terminated.

Although processes for determining workload balance have been described throughout as being specifically being applied to paths between a server and a storage device, it should be understood that the processes can be applied to other environments and for different entities. For example, the processes can be applied to determine whether host bus adapters within a server are balanced and to compare response times received through multiple paths. The processes can also be applied to determine whether fabrics are balanced. Additionally, the processes can be applied to ports (e.g., ports within a server or storage array) and switches across fabrics.

Computing Machine Architecture

Figure 5:
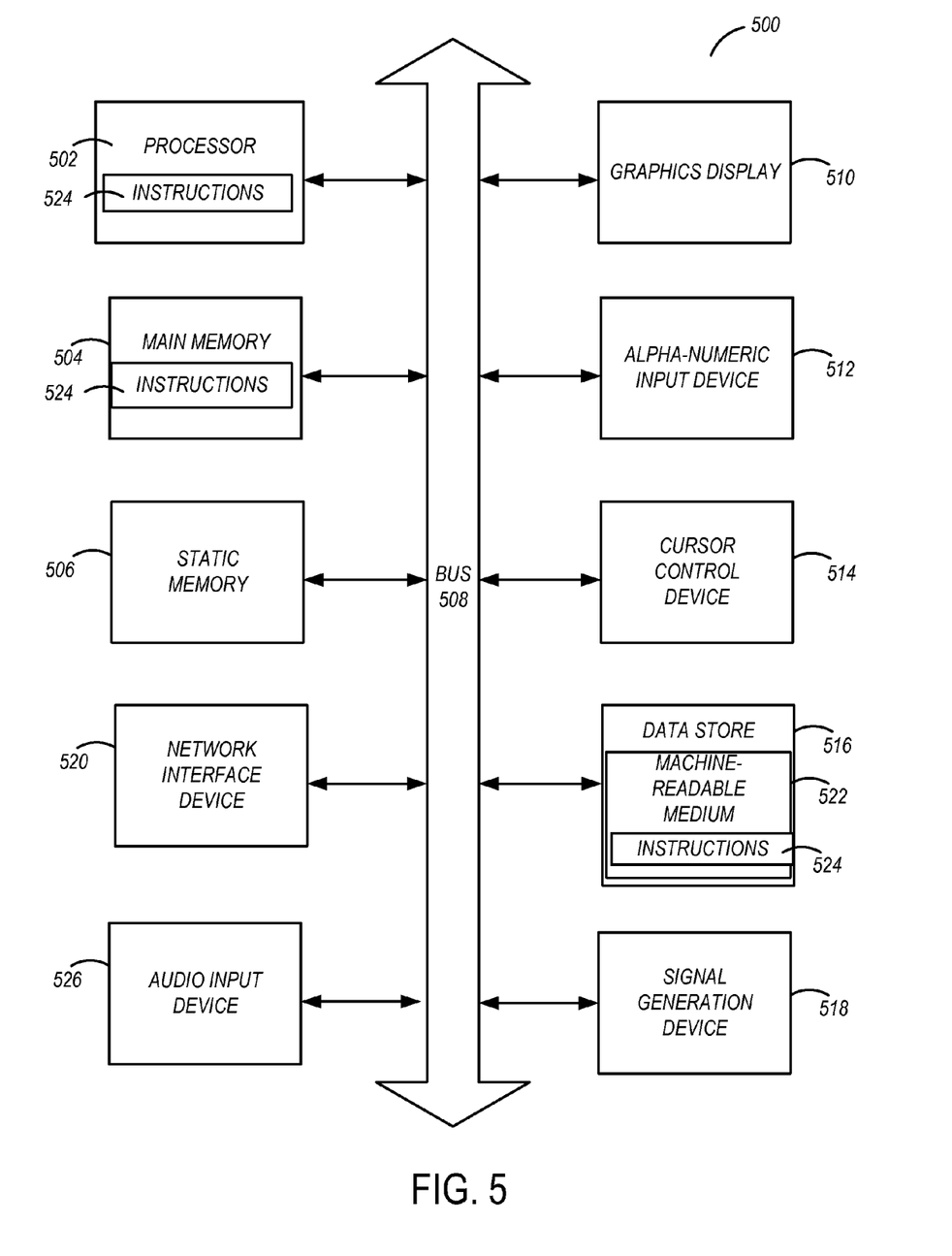
FIG. 5 is a block diagram illustrating components of an example machine according to one embodiment.

FIG. 5 is a block diagram illustrating components of an example machine able to read instructions from a non-transitory machine-readable medium and execute those instructions in a processor to perform the machine processing tasks discussed herein, such as the operations discussed above for the server 102, the storage device 104, the TAP patch panel 110, the monitoring system 112, and the information system 114. Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a data store 516, a signal generation device 518 (e.g., a speaker), an audio input device 526 (e.g., a microphone) and a network interface device 520, which also are configured to communicate via the bus 508.

The data store 516 includes a non-transitory machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network (not shown) via network interface 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 5.

Alternatively, hardware or software modules may be stored elsewhere within a computing system.

As referenced herein, a computer or computing system includes hardware elements used for the operations described here regardless of specific reference in FIG. 5 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

It is appreciated that the particular embodiment depicted in the figures represents but one choice of implementation. Other choices would be clear and equally feasible to those of skill in the art.

While the disclosure herein has been particularly shown and described with reference to a specific embodiment and various alternate embodiments, it will be understood by persons skilled in the relevant art that various changes in form and details can be made therein without departing from the spirit and scope of the disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience. This description should be read to include one or at least one and the singular also includes the plural unless it is obvious that it is meant otherwise.

Upon reading this disclosure, those of skill in the art will appreciate still additional alternative structural and functional designs for determining path balancing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
identifying an active path between a server and a storage device in a storage area network, the active path having associated with it first traffic data, the first traffic data including a plurality of first data points;
selecting from a plurality of paths between the server and the storage device, a paired path having associated with it second traffic data, the second traffic data including a plurality of second data points;
comparing, by a processing device, each data point in a first subset of the first data points with a corresponding second data point in a second subset of the second data points to determine a percentage difference between the compared data points, wherein the compared data points each represent traffic data on one of the active path or the paired path at a same point in time;
classifying each of the compared data points as balanced or imbalanced based on the percentage difference;
determining, based on the comparison, a measure indicating whether the active path is balanced with respect to the paired path; and
transmitting the determined measure to a user device for display to a user.

2. The method of claim 1, wherein the paired path is selected from among the plurality of paths based on the paired path being on a different switch fabric than the active path.

3. The method of claim 1, wherein the paired path is selected from among the plurality of paths based on a similarity between the first traffic data and the second traffic data.

4. The method of claim 1, wherein the first traffic data describes network traffic on the active path and the second traffic data describes network traffic on the paired path.

5. The method of claim 1, wherein the first data points are data transmission rates of the active path at various times and the second data points are data transmission rates of the paired path at various times.

6. The method of claim 1, wherein the first subset of the first data points are data points above a noise threshold and the second subset of the data points are second data points above the noise threshold.

7. The method of claim 1, wherein compared data points are classified as balanced responsive to the percentage difference between the compared data points being below a classification threshold.

8. The method of claim 1, wherein the compared data points are classified as imbalanced responsive to the percentage difference between the compared data points being above a classification threshold.

9. The method of claim 1, wherein the measure is determined based on the classification of each of the compared data points.

10. The method of claim 1, wherein determining the measure comprises:

classifying the active path and the paired path as balanced responsive to each of the compared data points being classified as balanced.

11. The method of claim 1, wherein determining the measure comprises:
classifying the active path and the paired path as balanced responsive to:
a percentage of data points classified as imbalanced being less than a first number;
a difference between a percentage of data points classified as balanced and the percentage of data points classified as imbalanced being greater than a second number; and
a difference between an average value of the data points classified as balanced and an average value of the data points classified as imbalanced being greater than a third number.

12. The method of claim 1, wherein determining the measure of balance comprises:
classifying the active path as imbalanced with respect to the paired path responsive to one or more of the following not being true:
a percentage of data points classified as imbalanced being less than a first number;
a difference between a percentage of data points classified as balanced and the percentage of data points classified as imbalanced being greater than a second number; and
a difference between an average value of the data points classified as balanced and an average value of the data points classified as imbalanced being greater than a third number.

13. The method of claim 1, further comprising:
responsive to determining that workload is imbalanced between the active path and the paired path, determining whether the active path and the paired path recently became imbalanced.

14. The method of claim 1, further comprising:
responsive to determining that workload is imbalanced between the active path and the paired path, determining whether the active path and the paired path recently became balanced.

15. The method of claim 1, further comprising:
determining a redundancy score for the active path and paired path based on whether the paired path is on a different switch fabric than the active path.

16. A computer-implemented method comprising:
identifying a first entity that processes network traffic, the first entity having associated with it first traffic data, the first traffic data including a plurality of first data points;
selecting from a plurality of additional entities that process network traffic, a second entity having associated with it second traffic data, the second traffic data including a plurality of second data points;
comparing, by a processing device, each data point in a first subset of the first data points with a corresponding second data point in a second subset of the second data points to determine a percentage difference between the compared data points, wherein the compared data points each represent traffic data associated with one of the first entity or the second entity at a same point in time;
classifying each of the compared data points as balanced or imbalanced based on the percentage difference;
determining, based on the comparison, a measure indicating whether the first entity is balanced with respect to the second entity; and
transmitting the determined measure to a user device for display to a user.

17. A computer-implemented method comprising:
identifying a first path in a network, the first path having associated with it first traffic data, the first traffic data including a plurality of first data points;
selecting from a plurality of paths in the network, a second path having associated with it second traffic data, the second traffic data including a plurality of second data points;
comparing, by a processing device, each data point in a first subset of the first data points with a corresponding second data point in a second subset of the second data points to determine a percentage difference between the compared data points, wherein the compared data points each represent traffic data on one of the first path or the second path at a same point in time;
classifying each of the compared data points as balanced or imbalanced based on the percentage difference;
determining, based on the comparison, a measure indicating whether the first path is balanced with respect to the second path; and
transmitting the determined measure to a user device for display to a user.

18. The method of claim 17, wherein the first traffic data describes network traffic on the first path and the second traffic data describes network traffic on the second path.

19. The method of claim 17, wherein the second path is selected from among the plurality of paths based on a similarity between the first traffic data and the second traffic data.

* * * * *